United States Patent [19]
Oshiage

[11] Patent Number: 4,637,280
[45] Date of Patent: Jan. 20, 1987

[54] CONTROL SYSTEM FOR MOTOR VEHICLE WITH CONTINUOUSLY VARIABLE TRANSMISSION AND ENGINE

[75] Inventor: Katsunori Oshiage, Yokohama, Japan

[73] Assignee: Nissan Motor Co., Ltd., Yokohama, Japan

[21] Appl. No.: 760,766

[22] Filed: Jul. 31, 1985

[30] Foreign Application Priority Data

Aug. 3, 1984 [JP] Japan ............................... 59-162893

[51] Int. Cl.$^4$ ..................... B60K 41/12; B60K 41/18
[52] U.S. Cl. .................................... 74/866; 364/424.1
[58] Field of Search ..................... 74/866; 364/424.1

[56] References Cited

U.S. PATENT DOCUMENTS

| | | | |
|---|---|---|---|
| 4,220,059 | 9/1980 | Mizumo et al. | 74/866 X |
| 4,281,567 | 8/1981 | Maurer | 74/866 |
| 4,291,594 | 9/1981 | Baudoin | 74/866 X |
| 4,497,223 | 2/1985 | Maruyama et al. | 74/866 |
| 4,507,968 | 4/1985 | Okamura et al. | 74/866 |
| 4,515,040 | 5/1985 | Takeuchi et al. | 74/866 |
| 4,543,077 | 9/1985 | Yamamuro et al. | 474/12 |
| 4,566,354 | 1/1986 | Kumura et al. | 74/866 |
| 4,572,031 | 2/1986 | Yokooku et al. | 74/866 |
| 4,580,465 | 4/1986 | Omitsu | 74/866 |
| 4,589,302 | 5/1986 | Oda et al. | 74/866 |

FOREIGN PATENT DOCUMENTS

| | | | |
|---|---|---|---|
| 58-160661 | 9/1983 | Japan . | |
| 0026656 | 2/1984 | Japan | 74/866 |

Primary Examiner—Kenneth J. Dorner
Assistant Examiner—Dirk Wright
Attorney, Agent, or Firm—Schwartz, Jeffery, Schwaab, Mack, Blumenthal & Evans

[57] ABSTRACT

A control system wherein there are determined a first and a second target value in terms of engine horse power. The first target value is a function of depression degree of accelerator, while the second target value is a function of engine speed. The first target value is generated as an output signal when a deviation in engine speed is smaller, while the second target value is generated as the output signal when the deviation is large. Based on this output signal, a device to adjust combustible charge to the engine is controlled such that the engine produces the horse power indicated by the output signal.

4 Claims, 7 Drawing Figures

CONTROL SYSTEM FOR MOTOR VEHICLE WITH CONTINUOUSLY VARIABLE TRANSMISSION AND ENGINE

RELATED APPLICATIONS

U.S. Patent Application Ser. No. 351,266 (now U.S. Pat. No. 4,507,986 issued on Apr. 2, 1985) filed on Feb. 22, 1982 (corresponding to EP-A 0 059 426 published on Sept. 8, 1982, Our Ref.: EP189-81) discloses a control system for a motor vehicle with a continuously variable transmission wherein opening degree of a throttle valve of an associated engine is adjusted in proportion to depression degree of accelerator pedal when the depression degree is smaller than a predetermined small value, but opening degree of throttle valve is kept constant at the fully opened state when the depression degree of accelerator pedal is larger than the predetermined small value. Engine speed is adjusted to a target engine speed by adjusting reduction ratio in continuously variable transmission. The target engine speed is a function of depression degree of accelerator pedal and vehicle speed.

U.S. patent application Ser. No. 411,987 (now U.S. Pat. No. 4,515,040 issued on May 7, 1985) filed on Aug. 26, 1982 (corresponding to EP-A 0 073 475 published on Mar. 9, 1983, Our Ref.: EP035082) discloses a control system for a motor vehicle with a continuously variable transmission wherein a target engine speed is determined as a first function of depression degree of accelerator pedal and a target engine torque is determined as a second function of the depression degree of accelerator pedal. Fuel supply device of an associated engine is adjusted by controlling opening degree of throttle valve or controlling fuel lever of fuel injection pump so as to adjust combustible charge admitted to engine in such a manner as to cause the engine to produce the target engine torque.

U.S. patent application Ser. No. 587,892 (now pending) filed on Mar. 9, 1984 (corresponding to EP-A 0 123 083 published on Dec. 19, 1984, Our Ref.: EP129-83) discloses a control system for a motor vehicle with a continuously variable transmission wherein a desired driving force is determined as a function of depression degree of accelerator pedal and vehicle speed, and a desired engine power is determined based on the desired driving force. A target throttle opening degree and a target engine speed which cause engine to produce the desired power are determined. Throttle actuator is also disclosed to adjust opening degree of throttle valve toward the target value, and reduction ratio continuously variable transmission is adjusted to cause engine to reach the target engine speed.

BACKGROUND OF THE INVENTION

The present invention relates to a control system for a motor vehicle having a continuously variable transmission and an engine.

There is known a control system for a motor vehicle having a continuously variable transmission and an engine. Such control system is disclosed in laying-upen Japanese Patent application 58-160661. In this known control system, horse power required for engine is determiend as a function of depression degree of an accelerator pedal associated with the engine, and an output torque and an engine speed which accomplish the horse power required are determined as a target output torque and a target engine speed, respectively. Reduction ratio of the continuously variable transmission is adjusted via feed-back control toward a target value where the target engine speed is accomplished and amount of intake air (or fuel) supplied to the engine is adjusted, via feed-back control, toward a target value large enough to cause the engine to produce the target output torque.

Figure 6:
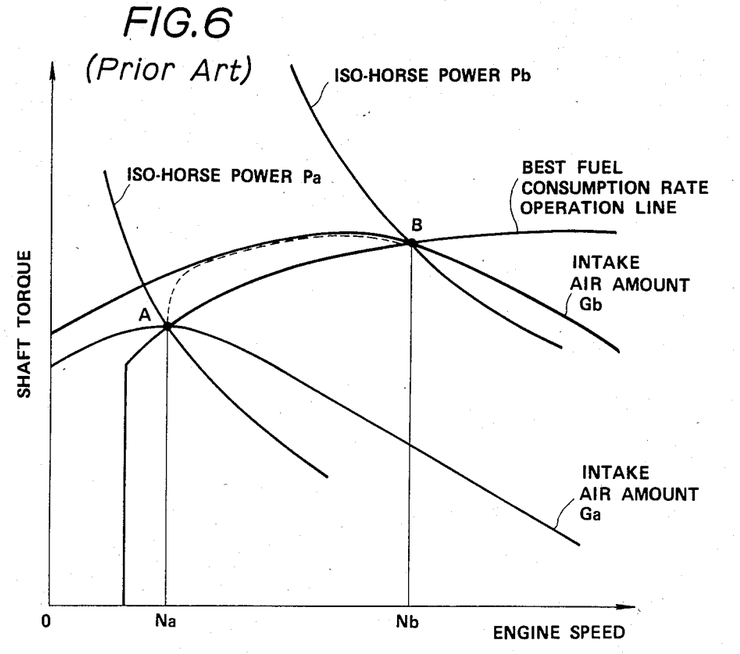
FIG. 6 shows performance curves of an engine used in the previously discussed known control system.
Figure 7:
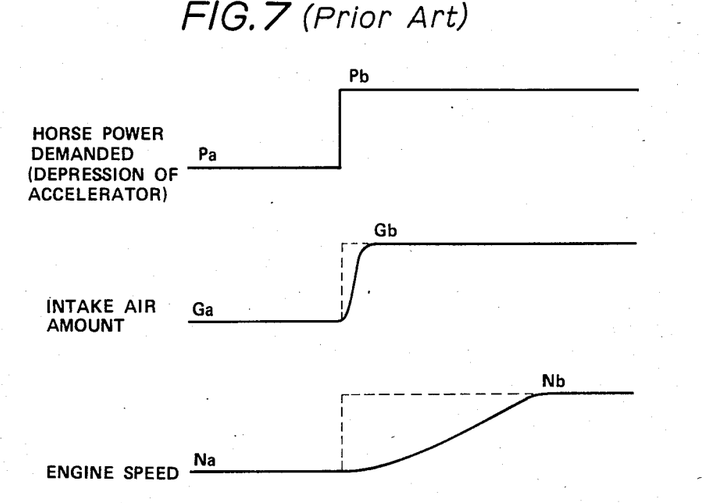
FIG. 7 is a timing diagram illustrating operation of the known control system.

The above mentioned known control system poses a problem during transient operation period after depression degree of accelerator pedal changes rapidly. Such rapid change in depression degree of accelerator pedal causes a rapid change in intake air amount supplied to engine and a less rapid change in engine speed. The sluggish response of engine speed during such transient period results from the fact that the engine speed is varied by shifting continuously variable transmission and actual shifting in reduction ratio takes a considerable time when the deviation is large. As a result, the engine cannot follow a best fuel consumption rate operation line (which may also be called as a best fuel economy operation line) and operates off the track of this operation line. This is more specifically explained referring to FIGS. 6 and 7. Assume now that horse power expressed in terms of depression degree of accelerator pedal is to change rapidly from a point on one iso-horse power curve Pa to another point on another iso-horse power curve Pb (i.e., in the case where operation state of engine is reqired to change from an operation point A to another point B). This causes a change in target engine speed from a value Na to another value Nb and a change in target intake air amount from Ga to Gb (see FIG. 6). As shown by fully drawn line in FIG. 7, actual intake air amount follows the change in the desired intake air amount and reaches the target value (Gb) with little delay, but, since actual shifting taking place in continuously variable transmission is not quick, a considerasble time is taken for the engine to reach a target value (Nb). Thus, eEngine traces operation line as illustrated by broken line in FIG. 6 which is deviated from the best fuel consumption rate operation line. As a result, fuel is consumed than necessary increases. The same problem arises in the case when horse power is to change rapidly from a point on iso-fuel consumption rate curve Pb to another point on iso-fuel consumption rate curve Pa.

The present invention contemplates to solve the above problem and provides a control system for a motor vehicle having a continuously variable as ansmission and an enginewhereby an associated engine keeps on operating on a best fuel consumption rate operation line even if there takes place a rapid change in horse power demand, which may be expressed in terms of a change in depression degree of accelerator pedal.

SUMMARY OF THE INVENTION

According to the present invention, there is provided a control system for a motor vehicle having an accelerator, an engine, a device to adjust combustible charge admitted to the engine, and a continuously variable transmission operatively associated with the engine such that the engine speed varies by effecting shifting in reduction ratio in the continuously variable transmission, said control system comprising:

an accelerator sensor coupled with the accelerator for detecting depression degree of the accelerator and generating an accelerator sensor signal indicative of the detected depression degree of the accelerato;

an engine speed sensor operatively associated with the engine for detecting engine speed of the engine and generating an engine speed sensor signal indicative of the detected engine speed;

means coupled with the said accelerator sensor for generating a target engine speed indicative signal indicative of a target engine speed which is a predetermined function of depression degree of the accelerator;

means coupled with said engine speed sensor and said target engine speed indicative signal generating means for generating a deviation indicative signal indicative of a deviation between the detected and target engine speeds and controlling shifting in reduction ratio in the continusouly variable transmission in such a manner as to decrease said deviation toward zero;

means responsive to said deviation indicative signal for selectively generating, as an output signal, a first target value which is a predetermined function of depression degree of the accelerator or a second target value which is a predetermined function of engine speed of the engine; and means responsive to said output signal for actuating the device in such a manner that the engine produces horse power indicated by said output signal.

According to another aspect of the present invention, there is provided a control method for a motor vehicle having an accelerator, an engine, a device to adjust combustible charge admitted to the engine, and a continuously variable transmission operatively associated with the engine such that the engine speed varies by effecting shifting in reduction ratio in the continuously variable transmission, said control method comprising the steps of:

detecting depression degree of the accelerator and generating an accelerator sensor signal indicative of the detected depression degree of the accelerato;

detecting engine speed of the engine and generating an engine speed sensor signal indicative of the detected engine speed;

generating a target engine speed indicative signal indicative of a target engine speed which is a predetermined function of depression degree of the accelerator;

generating a deviation indicative signal indicative of a deviation between the detected and target engine speeds and controlling shifting in reduction ratio in the continusouly variable transmission in such a manner as to decrease said deviation toward zero;

selectively generating, as an output signal, a first target value which is a predetermined function of depression degree of the accelerator when said deviation indicative signal attains a predetermined relationship with a predetermined reference of a second target value which is a predetermined function of the engine speed of the engine when said deviation indicative signal fails to attain said predetermined relationship with said predetermined reference; and actuating the device in response to said output signal.

DESCRIPTION OF THE EMBODIMENTS

Figure 1:
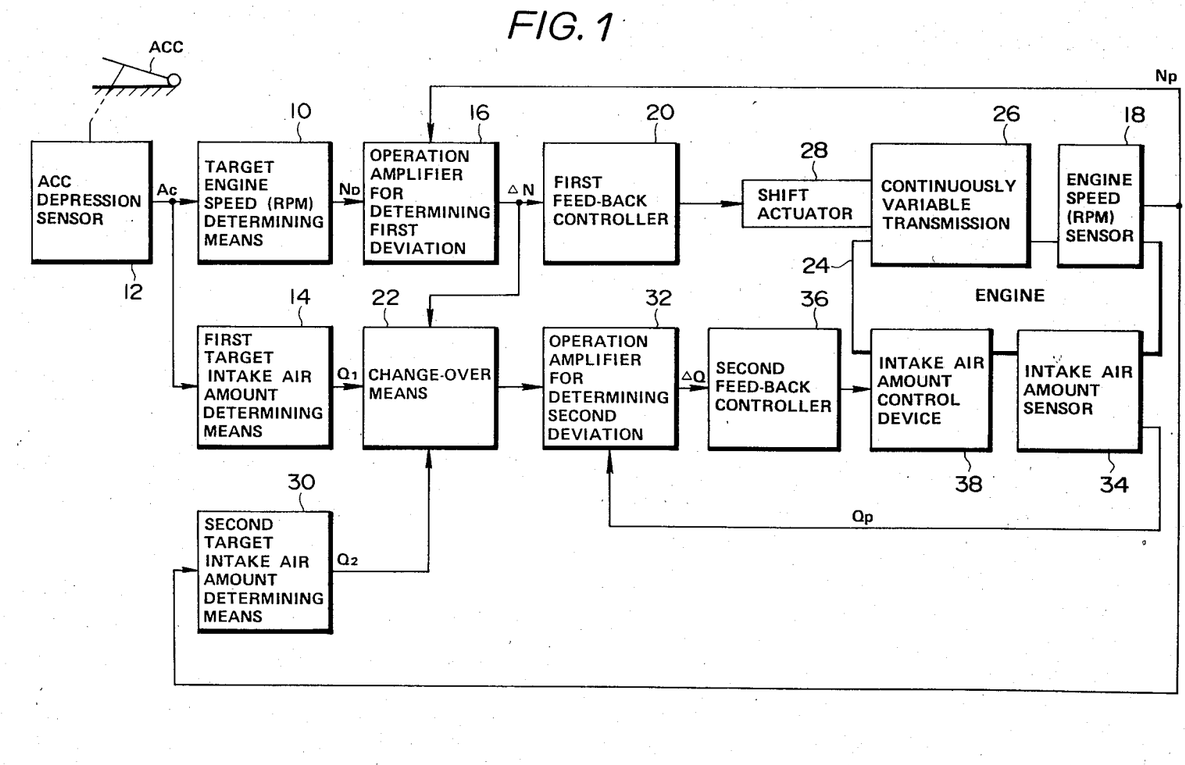
FIG. 1 is a block diagram of a first embodiment of a control system according to the present invention.

Referring to FIG. 1. there is illustrated a block diagram of a first embodiment according to the present invention. Reference numeral 10 designates a target engine speed determining means which determines a target engine speed $N_D$ against an output signal Ac of an accelerator depression sensor 12 using a predetermined function. Accelerator depression sensor 12 detects depression degree of an accelerator pedal ACC. associated with an engine 24 and generates an output signal indicative of the detected depression degree. Reference numeral 14 designates a first target intake air amount determining means which determines a first target intake air amount $Q_1$ against depression degree Ac of accelerator pedal using a predetermined function. The setting of target engine speed $N_D$ generated by target engine speed determining means 10 and first target intake air amount $Q_1$ generated by first target intake air amount determining means are such that, with these target values, the engine operates at a point on an iso-horse power curve which point gives the best fuel economy among all of the points forming this iso-horse power curve. It follows that operating engine by keeping engine speed and intake air amount at their target values, respectively, causes the engine to trace a best fuel consumption rate operation line.

Reference numeral 16 designates an operation amplifier for determining first deviation and reference numeral 20 a first feed-back controller which cooperate with each other to form a shift commander. The operation amplifier for determining first deviation 16 compares target engine speed $N_D$ generated by target engine speed determining means 10 with actual engine speed $N_P$ detected by engine speed sensor 18 so as to determine a deviation $\Delta N$, in engine speed, of the actrual value from the target velue. Output signal of operation amplifier for determining first deviation 16 indicative of the deviation $\Delta N$, in engine speed, is supplied to first feed-back controller 20. First feed-back controller 20 generates and applies a control signal to a shift actuator 28 so as to shift continuously variable transmission in reduction ratio and thus adjust engine speed of the associated engine 24 in such a manner as to bring the actual engine speed $N_P$ into agreement with the target engine speed $N_D$ (viz., in such a manner as to decrease the deviation $\Delta N$ toward zero).

Reference numeral 30 designates a second target intake air amount determining means which determines a second target intake air amount $Q_2$ against actual engine speed $N_P$ detected by engine speed sensor 18 using a predetermined function. The setting of this second target intake air amount $Q_2$ is such that, with this target intake air amount $Q_2$ and the actual engine speed $N_P$, the engine 24 operates at the best fuel consumption rate. An output signal of the second target intake air amount determining means 30 indicative of the second target intake air amount $Q_2$ is supplied to the change-over means 22. Also supplied to the change-over means 22 is output signal of the first target intake air amount determining means 14 indicative of the first target intake air amount $Q_1$. Change-over means 22 selects one of theses signals $Q_1$ and $Q_2$ in response to magnitude of the deviation $\Delta N$, in engine speed, supplied thereto by operation amplifier for determining first deviation 16. An output signal of change-over means 22 indicative of the signal selected is applied to operation amplifier for determining second deviation 32. Viz., when the absolute value of the deviation $\Delta N$ is smaller than a predetermined value, the first target intake air amount $Q_1$ is selected, while when the absolute value of the deviation $\Delta N$ is larger than the predetermined value, the second desired intake air amount $Q_2$ is selected.

Operation amplifier for determining second deviation 32 and a second feed-back controller 36 cooperate with each other to form a commander for controlling amount of intake air admitted to the engine. Operation amplifier for determining second deviation 32 calculates a deviation $\Delta Q$, in intake air amount, of actual value $Q_P$ applied thereto by intake air amount sensor 34 from the target value $Q_1$ or $Q_2$ indicated by the output signal of change-over means 22. An output signal of operation amplifier for determining second deviation 32 indicative of $\Delta Q$ is applied to second feed-back controller 36. Second feed-back controller 36 applies an actuating signal to an intake air amount control device 38 so as to actuate it in such a manner as to decrease the deviation $\Delta Q$ toward zero.

Acceleration depression sensor 12 may take the form of a potentiometer operatively connected with an acclerator pedal, such as shown at reference numeral 106 in EP-A 0 059 426 published on Sept. 8, 1982 or at reference numeral 24 in EP-A 0 073 475 published on Mar. 9, 1983. Engine speed sensor is a well known device which, for example, is shown at reference numeral 40 in the above mentioned EP-A 0 073 475. Intake air amount sensor 34 is a well known device often called as an air flow sensor.

Intake air amount control device 38 is in the form of a so-called throttle actuator which is a device that electromagnetically controls opening degree of a throttle valve mounted within an induction pipe. Such throttle actuator is disclosed in copending U.S. Patent Application Ser. No. 587,892 filed on Mar. 9, 1984, still pending, in the name of Hajime SATOH ET AL. (corresponding to EP-A 0 123 083 published on Dec. 19, 1984) which has been incorporated by reference. Other form of throttle actuator is disclosed at reference numerals 102, 114 in EP-A 0 059 426 or at reference numerals 10, 12, 14, 16 in EP-A 0 073 475.

Consinuously variable transmission 26 with shift actuator 28 is well known. Such continuously variable transmission is disclosed in EP-A 0 081 735 published on Oct. 6, 1982 (corresponding to U.S. patent application Ser. No. 362,489 filed on Mar. 26, 1982, now U.S. Pat. No. 4,543,077, in the name of Shigeaki YAMAMURO ET AL.). Reference should also made to EP-A 0 093 313 published on Oct. 9, 1983 (corresponding to U.S. patent application Ser. No. 486,331 filed on Apr. 19, 1983, now U.S. Pat. No. 4,566,354, in the name of Haruyoshi KUMURA ET AL.; Our Ref.: U139-82) in understanding a manner how to control shifting in reduction ratio in continuously variable transmission.

Figure 2:
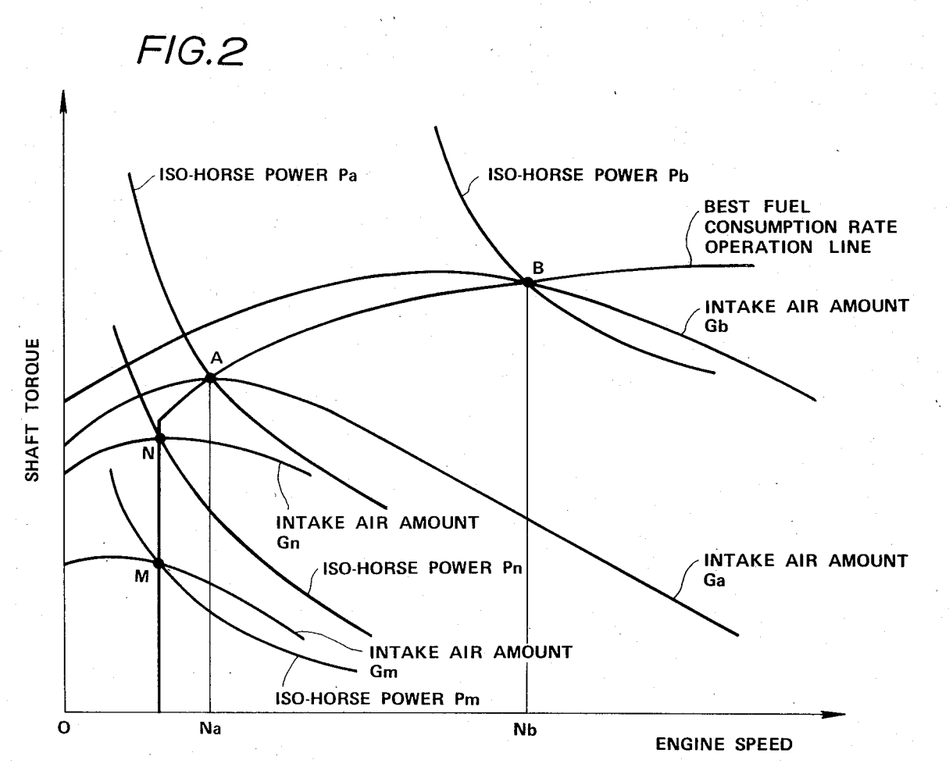
FIG. 2 shows performance characteristics curves of an engine used in this invention.

The operation is hereinafter described. Referring to FIG. 2, when it is desired to cause engine 24 to change from a point M to another point N both on the best fuel consumption rate operation line (viz., when it is desired to change horse power from Pm to Pn), since the target engine speed $N_D$ does not vary substantially during this change, the deviation $\Delta N$, in engine speed, remains smaller than the predetermined value, thus causing change-over means 22 to generate the output signal indicative of the first target intake air amount $Q_1$ determined by first target intake air amount determining means 14. This output signal is applied to operation amplifier for determining second deviation 32 where deviation $\Delta Q$, in intake air amount, is calculated. An output of operation amplifier for determining second deviation 32 indicative of the deviation $\Delta Q$ is applied to second feed-back controller 36. Since, based on this first target intake air amount $Q_1$, the feed-back control of the intake air amount control device 38 is carried out, the intake air amount control device 38 is actuated quickly at a fast response speed, thus increasing the actual intake air amount Q quickly. As the target engine speed does not vary substantially during this transient period, such rapid actuation of the intake air amount control device 38 does not cause the engine 24 to deviate from the best fuel consumption rate operation line.

When, on the other hand, a change in operating state of engine 24, from a point A to another point B both on the best fuel consumption rate operation line is desired (viz., when it is desired to changhe horse power from $P_A$ to $P_B$), the deviation $\Delta N$ of the actual engine speed $N_P$ from the target engine speed $N_D$ is larger than the predetermiend value, causing the change-over means 22 to select the second target intake air amount $Q_2$ determined by second target intake air amount determining means 30 and applies an output signal indicative of the selected one to operation amplifier for determining second deviation 32 where deviation $\Delta Q$ is calaculated. As a result, the feed-back control of intake air amount control device 38 is carried out such that actual intake air amount $Q_P$ follows second target intake air amount $Q_2$. The setting of the second intake air amount $Q_2$ obtained via determination by second target intake air amount determining means 30 is such that an intake air amount disposed on the best fuel comsumption rate operation line is given against each value of actual engine speed $N_P$. Thus, the second target intake air amount $Q_2$ increases gradually as the actual engine speed $N_P$ increases, causing the actual intake air amount $Q_P$ to vary with variation in engine speed. Thus, the operation state of the engine 24 changes from the point A to point B without any deviation from the best fuel consumption rate operation line.

It follows that in the case where the deviation $\Delta N$ in engine speed is smaller than the predetermined value so that there is little possibility of occurrence of deviation from the best fuel consumption rate operation line, the intake air amount is rapidly varied until a target operation point is reached, while in the case where the deviation $\Delta N$, in engine speed, is large and there is high possibility of occurrence of great deviation from the best fuel consumption rate operation line, the intake air amount is gradually varied. According to this control, therefore, the engine can be operated always on the best fuel consumption rate operation line.

Figure 3:
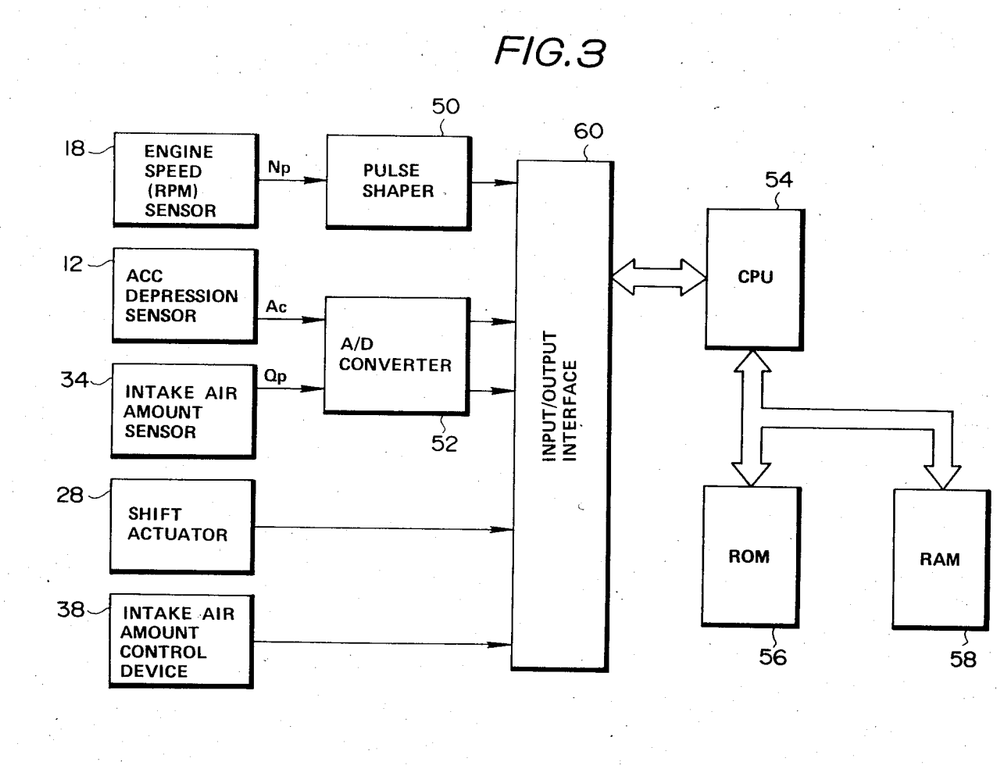
FIG. 3 a computer based control system implementing the control strategy employed in the first embodiment.

Referring to FIG. 3, a second embodiment is described where the above described control strategy is implemented in a microcomputer based control system. In FIG. 3, reference numeral 50 designates a pulse shaper via which pulse output signal generated by engine speed sensor 18 is converted to signal which can be accessible by the microcomputer. Reference numeral 52 designates an A/D converter which converts analog output signals of accelerator depression sensor 12 and intake air amount sensor 34 into digital signals which can be accessible by the microcomputer. After being converted, the output signals of engine speed sensor 18, accelerator depression sensor 12, and intake air amount sensor 34 are read via an input/output interface 60 by a Central Processor Unit (CPU) 54. CPU 54 processes input signals including the signals from the pulse shaper 50 and A/D converter 52 in accordance with programs stored in ROM 56 which stores not only programs necessary for actuating programs but also data necessary for operation to be performed by CPU 54. Reference numeral 58 designates a RAM which stores intermediate result and the like from operation performed by CPU 54. In accordance with instructions based on the result from operation perfomed in the CPU 54, the input/output interface 60 supplies output signals to shift actuator 28 and intake air amount control device 38, respectively, for actuating them.

Figure 4:
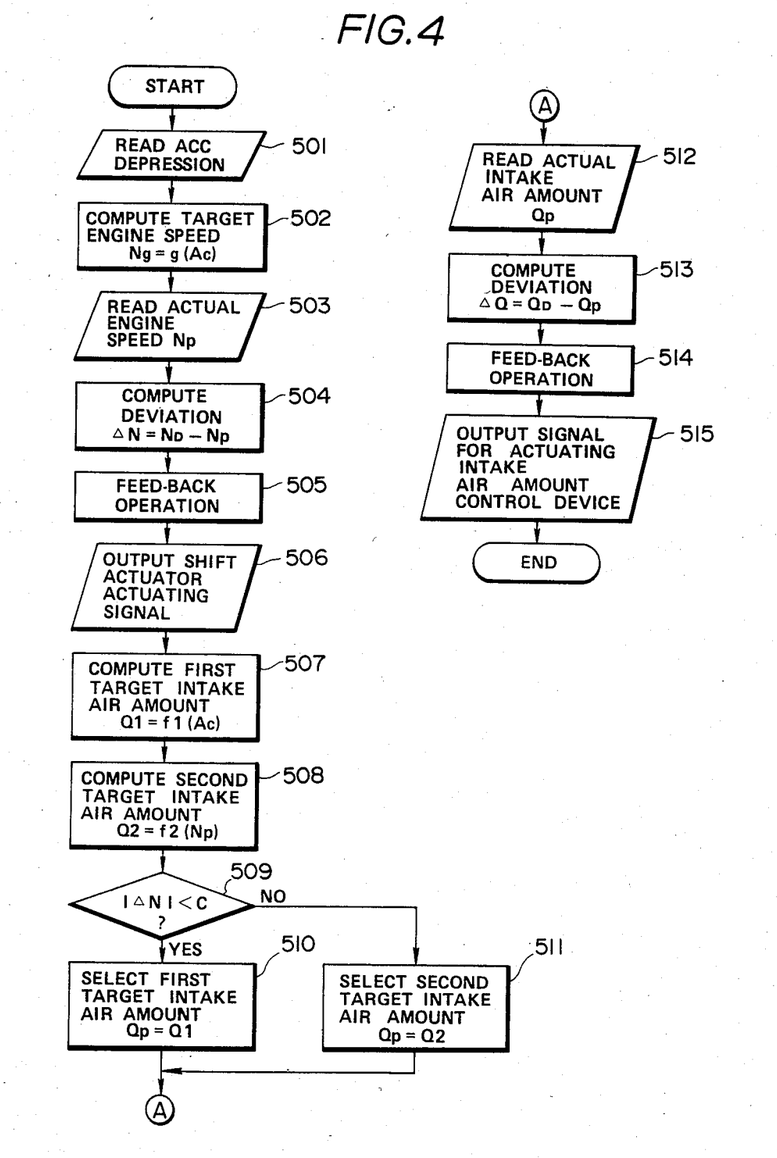
FIG. 4 is a flowchart.

Referring to flowchart shown in FIG. 4, the sequence of job steps performed by CPU 54 is decribed. First of all, depression degree Ac of accelerator pedal is read from accelerator depression sensor 12 (step 501). Using a predetermined function $N_D = g(Ac)$, target engine speed $N_D$ against the depression degree just read is calculated (step 502). Then, actual engine speed $N_P$ is read from engine speed sensor 18 (step 503). Deviation $\Delta N$ of actual engine speed $N_P$ from target engine speed $N_D$ is computed (step 504). Bsed on the deviation $\Delta N$, feed-back control is carried out (step 525) and an actuating signal is generated for application to shift actuator 28 in such a manner as to decrease the deviation $\Delta N$ toward zero (step 506). First target intake air amount $Q_1$ is calculated using a predetermined function $Q_1 = f_1(Ac)$ based on depression degree Ac of accelerator pedal obtained by reading in step 501 (step 507), and then second target intake air amount $Q_2$ is calculated using a predetermined function $Q_2 = f_2(N_P)$ based on the actual engine speed $N_P$ obtained by reading in step 503 (step 508). Determination is made whether or not the absolute value of the deviation $\Delta N$ is smaller than a predetermined value C (step 509). When the absoulte value of the deviation $\Delta N$ is smaller than the predetermined value C, the first target intake air amount $Q_1$ is set as a target value $Q_D$ (step 510), while when the deviation $\Delta N$ is larger than or equal to the predetermined value C, the second target intake air amount $Q_2$ is selected and set as target value $Q_D$ (step 511). Actual intake air amount $Q_P$ is read from the intake air amount sensor 34 (step 512). Deviation $\Delta Q$ of actual intake air amount $Q_P$ from target value $Q_D$ is calculated (step 513). Then, feed-back control is carried out based on this deviation $\Delta Q$ (step 514). A signal for actuating intake air amount control device 38 is generated for application to the device 38 is such a manner as to decrease the deviation $\Delta Q$ toward zero (step 515). As a result, the shift actuator 28 and air intake amount control device 38 are controlled in the same manner as in the first embodiment.

Figure 5:
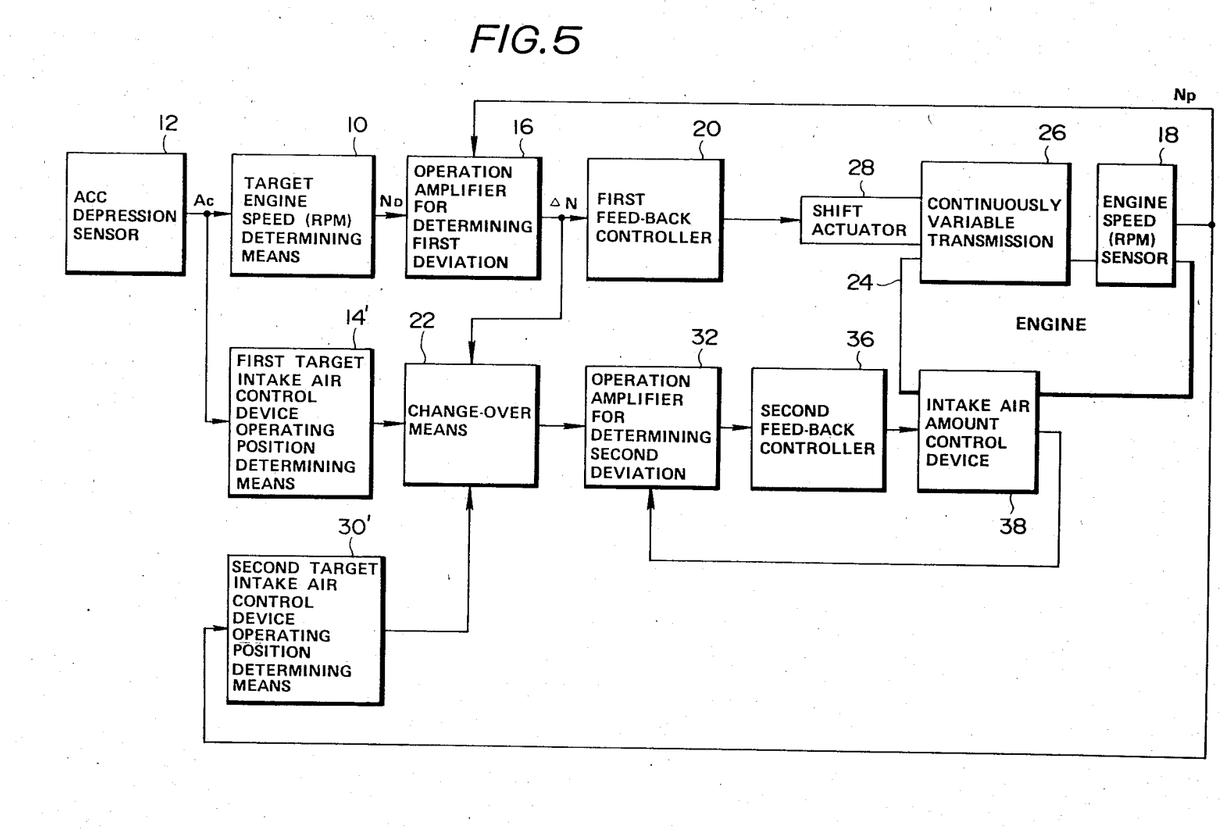
FIG. 5 is a block diagram of another embodiment.

Referring to FIG. 5, a third embodiment is described. As different from the first embodiment where intake air amount is the subject to be controlled, the third embodiment features the use of operating position of intake air amount control device 38 as the subject to be controlled. Since, in this embodiment, intake air amount is not actually detected, intake air amount sensor 34 used in the first embodiment is removed. The third embodimenmt is further different from the first embodiment in that first target intake air amount determining means 14 and second target intake air amount determining means 30 used in the first embodiment have been replaced with first target intake air control device operating position determining means 14' and second target intake air control device operating position determing means 30', respectively. Since operating position of intake air amount control device 38 corresponds to intake air mount detected by intake air amount sensor 34, this third embodiment is substantially the same as the first embodiment in operation and effect. Intake air amount control device 38 incoporates a position sensor for detecting operating position thereof, i.e., a position sensor for opening degree of a throttle valve, an output signal of the position sensor indicative of the operating position of the device 38 is applied to operation amplifier for determining second deviation 32.

Although, in the previously described embodiments, the amount of intake air is controllably adjusted to cause engine to produce horse power demanded by accelerator pedal, this does not apply to a diesel engine which is not provided with a throttle valve. The invention is however applicable to diesel engine if operating position of a control lever of a fuel injection pump is used as target value because horse power generated by diesel engine is controlled by the control lever of the fuel injection pump. Therefore, it will now be understood that the invention may be applicable to any type of engine if a suitable control variable which is closely related to adjustment of combustible charge admitted to the engine is used as target value instead of intake air amount (in the case of the first embodiment) or operating position of intake air amount control device (in the case of third embodiment). In other words, the invention may be embodied in a motor vehicle with an engine and a continuously variable transmission by adjusting a combustible charge supply device associated with the engine to first or second target value in accordance with a command judging from deviation of actual engine speed from target engine speed that is set as a function of depression degree of accelereator pedal, i.e., power demand.

What is claimed is:
1. A control system for a motor vehicle having an accelerator, an engine, a device to adjust combustible charge admitted to the engine, and a continuously variable tranmission operatively associated with the engine such that the engine speed varies by effecting shifting in reduction ratio in the continuously variable transmission, said control system comprising:

an accelerator sensor coupled with the accelerator for detecting depression degree of the accelerator and generating an accelerator sensor signal indicative of the detected depression degree of the accelerator;

an engine speed sensor operatively associated with the engine for detecting engine speed of the engine and generating an engine speed sensor signal indicative of the detected engine speed;

means coupled with said accelerator sensor for generating a target engine speed indicative signal indicative of a target engine speed which is a predetermined function of depression degree of the accelerator;

means coupled with said engine speed sensor and said target engine speed indicative signal generating means for generating a deviation indicative signal indicative of a deviation between the detected and target engine speeds and controlling shifting in reduction ratio in the continuously variable transmission in such a manner as to decrease said deviation toward zero;

means responsive to said deviation indicative signal for selectively generating, as an output signal, a first target value which is a predetermined function of depression degree of the accelerator or a second target value which is a predetermined function of engine speed of the engine; and means responsive to said output signal for actuating the device in such a manner that the engine produces horse power indicated by said output signal.

2. A control system as claimed in claim 1, wherein said selectively generating means includes:

means for comparing said deviation indicative signal with a predetermined reference and allowing generation of said first target value as said output signal when said deviation indicative signal attains a predetermined relationship with said predetermined reference and generation of said second target value as said output signal when said deviation indicative signal fails to attain said predetermined relationship.

3. A control system as claimed in claim 1, wherein said selectively generating means includes:

means for comparing absolute value of said deviation indicative signal with a predetermined reference value and allowing generation of said first target value as said output signal when said absolute value is smaller than said predetermined reference value and generation of said second target value as said output signal when said absolute value is larger than or equal to said predetermined reference value.

4. A control method for a motor vehicle having an accelerator, an engine, a device to adjust combustible charge admitted to the engine, and a continuously variable transmission operatively associated with the engine such that the engine speed varies by effecting shifting in reduction ratio in the continuously variable transmission, said control method comprising the steps of:

detecting depression degree of the accelerator and generating an accelerator sensor signal indicative of the detected depression degree of the accelerator;

detecting engine speed of the engine and generating an engine speed sensor signal indicative of the detected engine speed;

generating a target engine speed indicative signal indicative of a target engine speed which is a predetermined function of depression degree of the accelerator;

generating a deviation indicative signal indicative of a deviation between the detected and target engine speeds and controlling shifting in reduction ratio in the continuously variable transmission in such a manner as to decrease said deviation toward zero;

selectively generating, as an output signal, a first target value which is a predetermined function of depression degree of the accelerator when said deviation indicative signal attains a predetermined relationship with a predetermined reference or a second target value which is a predetermined function of the engine speed of the engine when said deviation indicative signal fails to attain said predetermined relationship with said predetermined reference; and actuating the device in response to said output signal in such a manner that the engine produces horse power indicated by said output signal.

* * * * *